3,835,114
OXIDIZED CATIONIC STARCH
Walter G. Hunt, Bridgeton, and Ray J. Belz, Mehlville, Mo., assignors to Anheuser-Busch, Incorporated, St. Louis, Mo.
No Drawing. Filed Feb. 26, 1973, Ser. No. 335,518
Int. Cl. C08b 19/06
U.S. Cl. 260—233.3 R                            6 Claims

ABSTRACT OF THE DISCLOSURE

A gelatinized, oxidized starch amine butene halide, having a carboxyl content equivalent to a degree of substitution of about 0.0036 to about 0.0108 and a degree of substitution of amine butene halide of about 0.15 to about 0.25, is prepared by gelatinizing an oxidized starch and reacting the gelatinized starch with an amine butene halide.

This disclosure covers the use of a cationic oxidized starch in the flocculation and dewatering of municipal raw primary sludge. From 0.016 to 0.1895% (based on the dry weight of the sludge) of the treated starch of 35 to 60 fluidity and 1.75 to 2.25% oxidation is added to the municipal sludge and contacted with the sewage for a period of 3 to 5 minutes before being dewatered to a moisture content below about 70% moisture, which is the moisture level at which the solids will adequately sustain combustion. The starch has from 0.15 to 0.25 degree substitution of an amine butene halide, specifically, 1-chloro-4-butenyl-trimethylammonium chloride.

BACKGROUND OF THE INVENTION

Presently treatment of raw sewage is a very important problem in the United States, and particularly to the larger cities which discharge part of the sewage treatment product into nearby rivers. In the treatment of municipal raw primary sewage, the sewage generally is initially deposited in a settling basin and the effluent is pumped directly to a river or other depository. The effluent may be further treated, in a secondary treatment process. The solids or sludge from the settling basins are filtered (generally on a rotary drum filter) and the filter cake is taken directly to an incinerator. This filter cake material usually needs to have about 30% solids so that it will adequately sustain combustion in the incinerator. This is called a primary sewage treatment and most cities either have or soon will have such processes in operation.

The sludge is negatively charged and an anionic polymer usually is added to the sludge before the cationic polymer is added. If only a cationic polymer is added the sludge dose not fluocculate as well as when the anionic material is used in combination.

The cationic material causes the sludge to flocculate so that the sludge is more easily filtered and a greater percentage of water can be removed by the filter. As mentioned, the dewatering apparatus presently used is a rotary vacuum filter. The present state of the art also utilizes lime and ferric chloride as chemical coagulants in the treatment of raw primary sludge prior to vacuum filtration. Certain acrylic-type polymers also are useful in the treatment of sludge to condition it for vacuum filtration.

There are certain teachings of the use of quaternary ammonium starch ethers as flocculants, particularly in the patents of Paschall 2,995,513 and Caldwell 2,975,124. Both of these patents relate to the use of starch ethers as flocculants. However, neither of these patents disclose the specific starch ether of the present invention (which contains a double bond) or its use as a sludge flocculant, and it is, therefore, a principal object of this invention to provide a cationic oxidized starch ether of specific characteristics which is useful as a flocculant in the treatment of primary sewage sludge at a reasonable cost. It is also an object of this invention to provide an oxidized starch product which has both anionic and cationic properties and which is very useful as a flocculating agent in the treatment of sewage sludge. These and other objects and advantages will become apparent hereinafter.

This invention comprises the use of an oxidized gelatinized cationic starch as a flocculating agent for primary sewage sludge.

DETAILED DESCRIPTION

In Hunt Patent No. 3,624,070 (assigned to the owner of the present invention), there is shown the preparation of granular gelatinizable quaternary ammonium starch ethers from starch and an amine alkene halide. In the present application an oxidized starch is gelatinized prior to reaction with the amine alkene halide so that a more random type of substitution is obtained. This enhances the flocculating effect of the starch ether. Also, the starch must be gelatinized prior to use, and the gelatinization prior to reaction also has the advantage of preparing a ready-to-use final product.

As will be described in detail hereinafter, it is important that the starch be oxidized to a specific range; that it be gelatinized prior to adding amine alkene halide; that the substitution be within a specified range, and that a specific amount of the starch ether be added to the sludge in order for the invention to be effective.

Hunt Patent No. 3,624,070 discloses methods of making the amine butene halide starch ether. However, this patent discloses the reaction with the starch in granular form. In the present invention, the starch is initially treated with sodium hypochlorite until it is oxidized to an available chlorine content of about 2.2%. The starch preferably is dent corn starch, but can be other non-waxy starches such as wheat, potato, sago and rice. The oxidation treatment preferably is with sodium hypochlorite but can be any other suitable oxidizing treatment, such as sodium periodate.

The dent corn starch is oxidized to an available chlorine content of about 1.75% to about 2.25%. This oxidation treatment can be carried on by any suitable method, but should be carried to the extent that it is equivalent to a sodium hypochlorite treated corn starch of this available chlorine content. Preferably, the available chlorine content is about 2.2%. The fluidity of the oxidized starch is about 35 to about 60.

In making up the amine butene halide reagent, we prefer to use the tertiary amines, since under the conditions used, they do not further react with halides to form a variety of products as do the primary and secondary amines, thereby reducing the yields and purity of the reagent. Of the tertiary amines, trimethylamine appears to offer the most advantages, not only because it is the most economical but also because of its reactivity in this reaction; however, other tertiary amines such as dimethyl benzyl, dimethyl lauryl (Armeen DM12D), and triethyl are also very reactive. Higher molecular weight tertiary amines such as tri-n-propyl, N-methyl morpholine, N-methyl piperidine, methyl diallylamine, and pyridine may also be used, but the alkylation reaction rates are considerably diminished. All tertiary amines capable of quaternizing with dichlorobutene also fall within the scope of this invention. Though the free amines are preferred, the corresponding amine salts may also be used after adding sufficient alkali to revert them to the free amines.

PROCESS FOR SODIUM HYPOCHLORITE TREATING CORN STARCH

In reacting sodium hypochlorite with dent corn starch, from about 2.0% to 2.25% by weight (based on the dry weight of the starch) available chlorine is reacted at 80 to 85° F. with about 42 to 50% by weight starch (dry basis) based on the combined water and starch which has been adjusted to pH 9.0 with a 2.0% NaOH solution. The sodium hypochlorite is added dropwise so as not to allow the pH to exceed 11.0. The reaction is then allowed to proceed for 1½ to 2½ hours after addition is complete or until the desired fluidity is achieved. The excess chlorine is removed with minimal amounts of solid sodium bisulfite by a spot plate test using O-Tolidine (complete removal of excess chlorine indicated by no color change). The starch is then adjusted to pH 6.5 to 5.0 with 1:1 HCl and diluted with excess water to 15° Bé, filtered on Buchner funnel, reslurried to 15° Bé, filtered again and dried.

The amine butene halide reagent described in Hunt 3,624,070 is the same reagent that is used in this invention. This reagent is known as amine alkene halide salt and this term is understood to include quaternary ammonium alkene halide salts. The reagent is represented by the following structural formula:

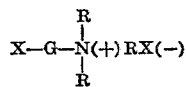

Where X is halide, R is methyl or ethyl and G is alkenylene. The alkenylene has from 1 to 4 carbons.

This product is reacted with gelatinized oxidized dent starch to produce the following product:

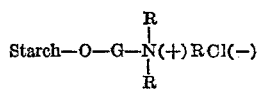

Where R is methyl or ethyl and G is alkenylene of 1 to 4 carbons.

One main difference between the starch reaction product of Patent No. 3,624,070 and the starch reaction product of this invention is the greater amount of amine butene halide added to the starch of the present reaction. Also, the starch is reacted in gelatinized condition rather than being reacted in granular form.

In reacting the amine butene halide (particularly 1-chloro-4-butenyltrimethylammonium chloride) with starch, from about 50 to 55% by weight (based on the dry weight of the starch) of the amine alkene halide is reacted with oxidized gelatinized starch for 4 to 5 hours at a temperature of about 65 to 75° C. using the technique of Ex. No. 1. The final product has a carboxyl number of about 0.1% to about 0.3% which corresponds to a degree of substitution (D.S.) of about 0.0036 to about 0.0108. The average molecular weight is about 89,000.

Example No. 1

In preparing the cationic starch, sodium hypochlorite treated dent starch of 53 fluidity and 2.2% chlorine is added to water in the proportion of 108 grams of starch (dry basis) to 400 ml. of water. From about 20 to about 25% by weight starch (dry basis) based on the combined water and starch can be used. The oxidized starch is prepared as hereinbefore described.

This mixture is gelatinized with live steam while stirring. Specifically, the starch is treated with steam at a temperature of 212 to 220° F. for a period of 5 to 10 minutes while being stirred.

The temperature is adjusted to 70° C. and the stirring is continued. At this point 32 g. of a 50% NaOH solution is added to the mixture of gelatinized starch and water with continued stirring. The NaOH is added as a catalyst and not as a gelatinizing agent. From about 12 to about 18% by weight NaOH (based on the dry weight of the starch) can be added. The temperature can be 65 to 75° C.

At this point, 111 g. of a 50% TAC solution (1-chloro-4-butenyltrimethylammonium chloride) is added. This reagent is prepared as hereinbefore described. This solution is allowed to react for four hours with stirring at 70° C. before it is diluted to 25% solids by weight with water to produce a gelatinized oxidized cationic starch.

From about 50 to about 55% by weight (based on the dry weight of starch) of the amine butene halide can be used. This reaction between the amine butene halide and the starch can continue for 4 to 5 hours at a temperature of 65 to 75° C.

Following are Examples of treating raw primary sewage with the cationic oxidized starch of this invention.

Example No. 2

A mixture of 108 g. (dry basis) 7303 (lightly oxidized dent starch) in 300 ml. water is gelatinized with steam and diluted with 300 ml. water. The dent starch had a chlorine content of 2.20%. The gelatinized starch is transferred to a 70° C. water bath and 32 g. of 50% NaOH solution and 111 g. 50% TAC solution are added. The TAC is 1-chloro-4-butenyltrimethylammonium chloride. This mixture is reacted for 4 hours at 70° C. The resultant product is 21% solids by weight and has a degree of substitution of 0.25.

Composite samples of primary sludge were picked up from a municipal sewage treatment plant. Cationic starch at a concentration of 0.5% was examined using the following method:

A predetermined amount (based on the dry weight of the sludge) of a 0.05% by weight aqueous solution of an anionic polyelectrolyte is added to 200 ml. of raw primary sludge and mixed back and forth ten times between two beakers. This anionic polyelectrolyte is a very high molecular weight synthetic water soluble hydrolyzed polyacrylamide labeled under the tradename Purifloc A–23 and made by the Dow Chemical Company. (In all of the following Examples this anionic polyelectrolyte will simply be referred to as Purifloc A–23.)

A specific weight (based on the dry weight of the sludge) of a 0.5% by weight aqueous solution of cationic polyelectrolyte prepared according to Example No. 3 is then added, mixed back and forth at 76° F. ten times between two beakers, and transferred to a Buchner funnel fitted with Whatman #1 filter paper. The pressure in the filtrate received was reduced to 13" Hg and the filtrate collected after 30, 60, 90, and 120 seconds determined.

Results are as follows:

| Run | Sludge (ml.) | Percent solids | Amount of anionic polyelectrolyte added (percent)[1] | Amount of cationic oxidized starch added (percent)[1] | Filtrate, ml. at (seconds) | | | | Percent solids after filtration |
|---|---|---|---|---|---|---|---|---|---|
| | | | | | 30 | 60 | 90 | 120 | |
| 1 | 200 | 5.0 | .025 | .100 | 130 | 167 | 173 | 175 | 40.0 |
| 2 | 200 | 6.4 | .035 | .097 | 95 | 142 | 160 | 168 | 40.0 |
| 3 | 200 | 5.4 | .037 | .097 | 112 | 150 | 160 | 167 | 32.7 |
| 4 | 200 | 11.4 | .022 | .098 | 60 | 97 | 120 | 130 | 32.6 |
| 5 | 200 | 3.5 | .011 | .100 | 70 | 125 | 170 | 183 | 41.2 |
| 6 | 200 | 9.6 | .017 | .047 | 83 | 123 | 147 | 158 | 45.7 |
| 7 | 200 | 2.0 | .025 | .100 | 85 | 125 | 155 | 172 | 14.3 |
| 8 | 200 | 9.5 | .025 | .092 | 137 | 160 | 163 | 165 | [2]55.9 |
| 9 | 200 | 5.0 | .015 | .100 | 112 | 158 | 172 | 177 | [2]43.5 |
| 10 | 200 | 5.2 | .029 | .096 | 150 | 175 | 178 | 178 | 44.3 |
| 11 | 200 | 9.9 | .025 | .101 | 115 | 130 | 135 | 137 | 31.4 |
| 12 | 200 | 5.2 | .012 | .096 | 115 | 160 | 172 | 175 | 41.6 |
| 13 | 200 | 5.2 | .024 | .096 | 123 | 168 | 174 | 176 | 43.3 |
| 14 | 200 | 3.6 | .024 | .097 | 92 | 137 | 158 | 170 | 24.0 |
| 15 | 200 | 9.4 | .027 | .098 | 73 | 100 | 114 | 123 | 24.4 |
| 16 | 200 | 6.0 | .025 | .100 | 102 | 140 | 153 | 160 | 30.0 |

[1] Based on dry weight of sludge.
[2] Average.

In all tests, the minimal quantities of polyelectrolytes required to increase solids to approximately 30% in 120 seconds was used as criteria for adequate flocculation and dewatering. The 30% solids level after filtration is an adequate solids content for sustaining combustion when the filter cake is later incinerated.

Example No. 3

A predetermined amount (based on the dry weight of the sludge) of a 0.05% by weight aqueous solution of an anionic polyelectrolyte (Purifloc A-23) is added to 2000 ml. of raw primary sludge and mixed. Then a specific amount of a 0.5% by weight aqueous solution of cationic polyelectrolyte (based on the dry weight of the sludge) prepared according to Example No. 1 is added and mixed, being sure not to deflocculate the sludge with the agitation. A filter leaf with a reduced pressure of 13" Hq is then lowered into the conditioned sludge. Filtrate is collected for 60 seconds and the filter leaf is removed and allowed to dry under reduced pressure for another 180 seconds. The filter cake is then removed and percent solids and total dry solids are determined. Results are as follows:

| Run | Sludge (ml.) | Percent solids | Amount of cationic oxidized starch added (percent)[1] | Amount of anionic polymer added (percent)[1] | Percent solids after filtration |
|---|---|---|---|---|---|
| 1 | 2,000 | 6.5 | .045 | .032 | 23.8 |
| 2 | 2,000 | 7.0 | .045 | .032 | 27.8 |
| 3 | 2,000 | 6.0 | .045 | .032 | 29.4 |
| 4 | 2,000 | 7.4 | .045 | .032 | 24.9 |

[1] Based on dry weight of sludge.

In this Example, the test procedure for determining adequate flocculation and dewatering by the polyelectrolyte has been changed from the Buchner funnel test that was used in Example No. 2 This is due primarily to the small percentage polyelectrolyte (dry basis) by weight used based on the dry weight of the sludge. In all tests, approximately 30% solids after four minutes vacuum filtration on a filter leaf was used as criteria for adequate flocculation and dewatering.

Example No. 4

Following is a plant size run using oxidized dent cationic starch in which the starch is 2.2% oxidized and has a degree of substitution of 0.25 for the amine butene halide. The sewage treatment plant is a commercial operation and the sludge had an initial solids content of 10.8% by weight. The starch is added to the sewage as a 0.5% by weight solution at a 0.04875% by weight basis (based on the dry weight of the sewage).

The amine polyelectrolyte (Purifloc A-23) is added as a 0.05% by weight aqueous solution at a 0.0275% by weight basis (based on the dry weight of the sludge). The treated sludge is filtered on a rotary filter at a rate of 277.5 wet pounds per minute. The treated sludge has a solids content of 31.95%. On a dry solids basis, 0.975 pounds of starch reactant is added per ton of dry sludge recovered. This is a very satisfactory performance both from a cost and a technical viewpoint.

Example No. 5

The following is a 15 day plant size run using oxidized dent cationic starch in which the starch is 2.2% oxidized and has a degree of substitution of 0.25 of an amine butene halide (particularly 1-chloro-4-butenyltrimethylammonium chloride). The cationic starch is added as a 1.128% solution by weight. The anionic polyelectrolyte (Purifloc A-23) is added as a 0.05% solution by weight. The sewage treatment plant is a commercial operation and the results obtained are as follows:

| Run | Percent solids | Amount of cationic oxidized starch added (percent)[1] | Amount of anionic polyelectrolyte added (percent)[1] | Percent solids after filtration | Dry tons filtered | Pounds oxidized cationic starch per dry ton sludge | Pounds anionic polyelectrolyte added per dry ton sludge |
|---|---|---|---|---|---|---|---|
| 1 | 7.7 | .136 | .035 | 27.8 | 50.3 | 2.7 | .70 |
| 2 | 8.3 | .082 | .033 | 30.6 | 49.8 | 1.65 | .65 |
| 3 | 8.0 | .071 | .033 | 29.4 | 38.3 | 1.44 | .65 |
| 4 | 9.5 | .070 | .051 | 29.0 | 39.1 | 1.41 | 1.02 |
| 5 | 7.0 | .027 | .040 | 29.3 | 49.9 | .54 | .80 |
| 6 | 15.6 | .016 | .023 | 40.7 | 83.3 | .33 | .45 |
| 7 | 13.5 | .093 | .034 | 42.9 | 29.3 | 1.86 | .68 |
| 8 | 9.5 | .051 | .037 | 41.0 | 53.9 | 1.02 | .74 |
| 9 | 11.1 | .134 | .052 | 29.6 | 40.7 | 2.67 | 1.04 |
| 10 | 9.8 | .075 | .042 | 28.3 | 36.2 | 1.5 | .83 |
| 11 | 10.8 | .119 | .033 | 33.0 | 23.0 | 2.37 | .65 |
| 12 | 7.4 | .067 | .025 | 30.1 | 20.5 | 1.32 | .49 |
| 13 | 8.6 | .142 | .039 | 29.5 | 38.5 | 2.85 | .78 |
| 14 | 9.9 | .137 | .038 | 29.8 | 39.9 | 2.73 | .75 |
| 15 | 9.2 | .091 | .027 | 31.4 | 59.9 | 1.83 | .54 |

[1] Based on dry weight of the sludge.

In all the daily runs the criteria for adequate flocculation and dewatering was 30% solids level after filtration. The average percent solids for the entire 15 day run was 32.2%. On a dry solids basis, an average of 1.63 pounds cationic starch (0.0815% based on dry weight of the sludge) was added per dry ton sludge recovered. This was a very satisfactory performance both from a cost and technical viewpoint.

What is claimed is:

1. A method of making a gelatinized cationic starch ether comprising the steps of
    (a) gelatinizing an oxidized starch having a carboxyl-content equivalent to a degree of substitution of about 0.0036 to about 0.0108,
    (b) reacting the gelatinized starch with an amine butene halide to produce a degree of substitution of amine butene halide of about 0.15 to about 0.25.

2. The method of claim 1 wherein the starch is dent corn starch.

3. The method of claim 1 wherein the amine butene halide is 1-chloro-4-butenyltrimethylammonium chloride.

4. The method of claim 1 wherein the starch is dent corn starch and the amine butene halide is 1-chloro-4-butenyltrimethylammonium chloride.

5. A gelatinized oxidized starch amine butene halide having a carboxyl content equivalent to a degree of substitution of about 0.0036 to about 0.0108 and a degree of substitution of amine butene halide of about 0.15 to about 0.25.

6. The product of claim 5 wherein the amine butene halide is 1-chloro-4-butenyltrimethylammonium chloride.

References Cited

UNITED STATES PATENTS

| 3,624,070 | 11/1971 | Hunt | 260—233.3 |
| 2,975,124 | 3/1961 | Caldwell et al. | 260—233.3 |

MELVYN I. MARQUIS, Primary Examiner

U.S. Cl. X.R.

210—54; 260—233.3A